United States Patent
Previdi et al.

(10) Patent No.: US 8,014,318 B2
(45) Date of Patent: Sep. 6, 2011

(54) ROUTING-BASED PROXIMITY FOR COMMUNICATION NETWORKS TO ROUTING-BASED PROXIMITY FOR OVERLAY NETWORKS

(75) Inventors: Stefano Previdi, Rome (IT); Jining Tian, Cupertino, CA (US); Steven Luong, San Jose, CA (US); Bruce Davie, Cambridge, MA (US); Jan Medved, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 12/368,436

(22) Filed: Feb. 10, 2009

(65) Prior Publication Data

US 2010/0202448 A1   Aug. 12, 2010

(51) Int. Cl.
*H04L 12/28* (2006.01)
*H04L 12/56* (2006.01)

(52) U.S. Cl. .......................................... 370/254; 370/389

(58) Field of Classification Search .................. None
See application file for complete search history.

(56) References Cited

U.S. PATENT DOCUMENTS

| | | | |
|---|---|---|---|
| 5,920,727 A | 7/1999 | Kikinis et al. | |
| 7,613,135 B2 | 11/2009 | Li et al. | |
| 7,733,117 B1 | 6/2010 | Priel et al. | |
| 7,752,024 B2 | 7/2010 | Ball et al. | |
| 7,756,042 B2 | 7/2010 | Guo et al. | |
| 2002/0083284 A1 | 6/2002 | Matsubara et al. | |
| 2004/0128528 A1 | 7/2004 | Poisner | |
| 2004/0225439 A1 | 11/2004 | Gronemeyer | |
| 2005/0047353 A1* | 3/2005 | Hares | 370/255 |
| 2005/0265239 A1* | 12/2005 | Previdi et al. | 370/238 |
| 2006/0007616 A1 | 1/2006 | Pan et al. | |
| 2006/0173855 A1* | 8/2006 | Turner et al. | 707/10 |
| 2007/0064702 A1 | 3/2007 | Bastes et al. | |
| 2007/0237081 A1* | 10/2007 | Kodialam et al. | 370/235 |
| 2007/0237097 A1* | 10/2007 | Maharana et al. | 370/255 |
| 2007/0268059 A1 | 11/2007 | Sakaguchi et al. | |
| 2008/0256175 A1* | 10/2008 | Lee et al. | 709/203 |
| 2009/0240758 A1* | 9/2009 | Pasko et al. | 709/201 |
| 2010/0125643 A1* | 5/2010 | Gerber et al. | 709/217 |
| 2010/0128638 A1 | 5/2010 | Navas et al. | |

FOREIGN PATENT DOCUMENTS

| | | |
|---|---|---|
| CN | 102057637 A | 5/2011 |
| EP | 0 150 480 B1 | 12/1984 |
| WO | WO 2010/144291 | 12/2010 |

OTHER PUBLICATIONS

Pending U.S. Appl. No. 11/948,799, filed Nov. 30, 2007, Previdi et al.

(Continued)

*Primary Examiner* — Robert Scheibel
(74) *Attorney, Agent, or Firm* — Patent Capital Group

(57) ABSTRACT

A node in an overlay network requests a ranked list of other nodes in the overlay network that can provide a desired piece of content or service to the requesting node. A separate node such as a router generates the ranked list using a routing algorithm, returning the list to the requesting node so that the requesting node may acquire the desired content or service from the nearest node in the overlay network.

17 Claims, 2 Drawing Sheets

OTHER PUBLICATIONS

Vinay Aggarwal, Anja Feldmann, Christian Scheideler; "Can ISPs and P2P Users Cooperate for Improved Performance?" ACM SIGCOMM Computer Communication Review, vol. 37, No. 3, Jul. 2007.

Ruchir Bindal, Pei Cao and William Chan, Jan Medval, George Suwala, Tony Bates, Amy Zhang; "Improving Traffic Locality in BitTorrent via Biased Neighbor Selection".

U.S. Appl. No. 12/480,941, entitled "Routing-Based Proximity for Communication Networks," Filed Jun. 9, 2009, Inventor(s): Stefano Previdi et al.

Akonjang, O. et al., "The PROXIDOR Service," IETF Draft, Mar. 2, 2009 XP015060381, 17 pgs.

PCT Notification of Transmittal (1 page) of the International Search Report (3 pages) and the Written Opinion of the International Searching Authority, or the Declaration (4 pages) mailed Aug. 19, 2010 for PCT/US2010/037135.

USPTO Jan. 24, 2011 Nonfinal Office Action from U.S. Appl. No. 12/480,941.

USPTO Apr. 25, 2011 Response to Jan. 24, 2011 Nonfinal Office Action from U.S. Appl. No. 12/480,941.

USPTO Jul. 19, 2011 Nonfinal Office Action from U.S. Appl. No. 12/480,941.

* cited by examiner

Overall Logic

Detached Logic Flow (Example)

ROUTING-BASED PROXIMITY FOR COMMUNICATION NETWORKS TO ROUTING-BASED PROXIMITY FOR OVERLAY NETWORKS

FIELD OF THE INVENTION

The present invention relates generally to determining proximity in communication networks, including but not limited to peer-to-peer networks and other forms of overlay networks.

BACKGROUND OF THE INVENTION

A peer-to-peer network is an example of a network (of a limited number of peer devices) that is overlaid on another network, in this case, the Internet. In such networks it is often the case that a piece of content or a service desired by one of the peers can be provided by more than one other node in the overlay network, and it is desirable to select the source node to optimize efficiency.

BRIEF DESCRIPTION OF THE DRAWINGS

The details of the present invention, both as to its structure and operation, can best be understood in reference to the accompanying drawings, in which like reference numerals refer to like parts, and in which.

DESCRIPTION OF EXAMPLE EMBODIMENTS

Overview

An apparatus includes processor and a computer readable storage medium bearing instructions to cause the processor to receive node identifications from a requesting node. The node identifications are associated with respective peers to the requesting node in an overlay network that uses infrastructure of a backbone network. The processor uses a shortest path first (SPF) algorithm to determine a respective metric associated with each peer and the requesting node. Based on the metric, a list of peers is generated and returned to the requesting node.

In example non-limiting embodiments the apparatus can be a service gateway (SG).

If desired, the SG may never originate any routing update pursuant to its cooperation with the overlay network. Also, the SG may never attract traffic pursuant to its cooperation with the overlay network.

In example implementations the TENT list of the apparatus is initialized prior to generating the list of peers by moving into the TENT list all nodes that advertise the requesting node. Pseudonodes can be given higher preference than non-pseudonodes as part of generating the list of peers. Further, a proximity of nodes sharing a common prefix with the requesting node can be set to zero.

In another embodiment, a tangible computer readable medium bears instructions executable by a computer processor for receiving from a requesting node in a communication network a list of other nodes in the network that can provide a desired piece of content or service to the requesting node. The instructions cause the processor to generate a ranked list of the other nodes and return the ranked list to the requesting node.

In another embodiment, a computer-implemented method includes receiving a list of at least two nodes from a requesting node, executing a shortest path first (SPF) algorithm on each of the at least two nodes relative to the requesting node to generate an ordered list of the at least two nodes, and returning the ordered list to the requesting node.

Example Embodiments

Figure 1:
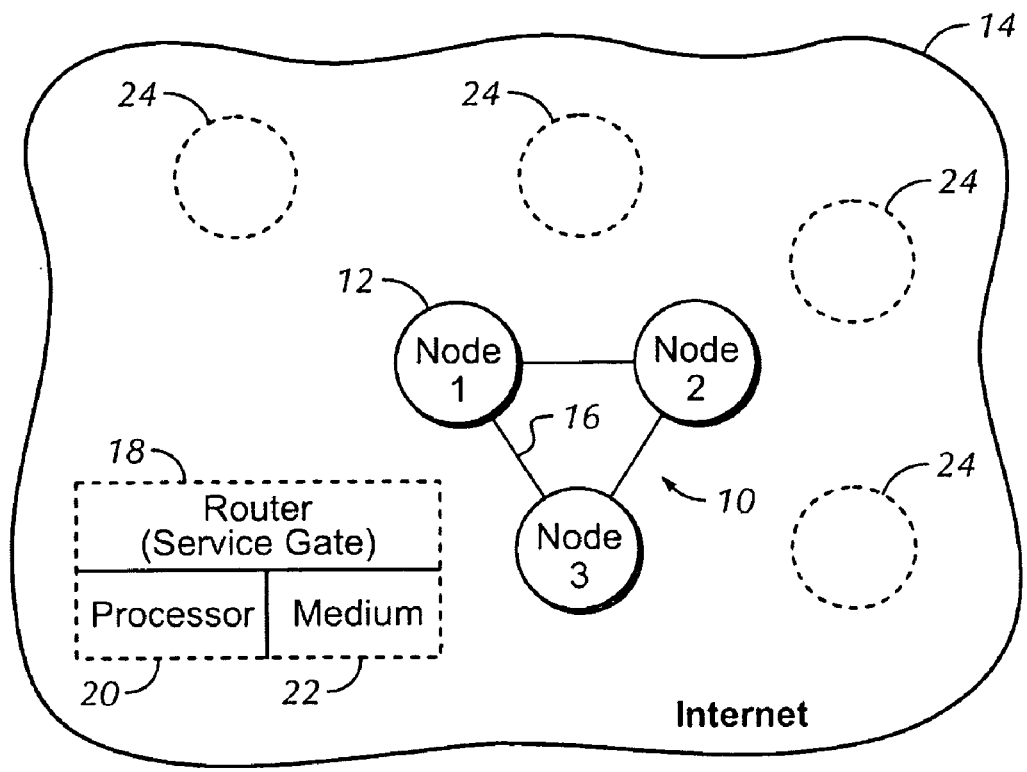
FIG. 1 is a block diagram of an example system in accordance with present principles.

Referring initially to FIG. 1, an overlay network 10 includes plural nodes 12 (for simplicity, only three nodes, labeled "node 1", "node 2", and "node 3", are shown in the overlay network 10). The overlay network 10 is "overlaid" on a backbone network 14 such as the Internet in that the overlay network 10 uses the infrastructure of the backbone network 14.

In the embodiment shown the overlay network 12 may be a peer-to-peer network in which content is moved along overlay network links 16 among consumer end points such as personal digital assistants (PDAs), etc., it being understood that present principles are not necessarily limited to peer-to-peer networks. For example, present principles may apply to a service provider operated overlay network such as a network of service nodes or a service provider operated content delivery network (CDN). Further, in some embodiments an overlay network is not necessarily implicated when, for instance, a proximity-sorted list of nodes is to be generated by one node on behalf of another node so that the other node can know the nearest instance of a network service such as a cache or voice-over-Internet gateway for example.

The backbone network 14 may include a service gateway (SG) 18 that can communicate with the overlay network 10. Indeed, the SG 18 may be part of the overlay network 10. In one example embodiment the SG 18 may be implemented by a router or switch or server or other node type.

Typically, the SG 18 includes one or more processors 20 accessing one or more computer readable storage media 22 such as solid state storage, disk storage, etc. A program, referred to herein as a proximity function, may embody portions of present logic and may be stored on the media 22 for execution thereof by the processor 20. Other parts of the logic may be implemented by one or more nodes 12 of the overlay network 10. Also, other nodes 24 including end user client devices, Internet servers, routers, switches, etc. typically are part of the backbone network 14.

Figure 2:
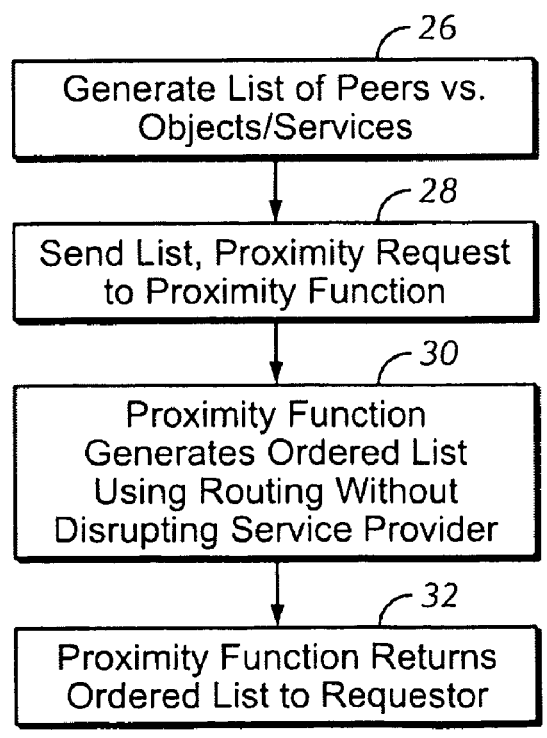
FIG. 2 is a flow chart of general example logic.

FIG. 2 shows overall example logic in accordance with present principles. In describing FIGS. 2 and 3 the following terms are used:

Autonomous System is a set of routers and links under a common administration, typically a service provider network (or a regional part of one) or an enterprise network. An Autonomous System, in addition to being directed to organizing a network, also has implications in the way BGP protocol (defined below) is deployed.

Interior Gateway Protocol (IGP) is a routing protocol deployed inside an Autonomous System and used to create routing schemes including nodes (routers) and links that form the network topology through which IP packets are routed/forwarded. Example IGPs include Open Shortest Path First (OSPF, a link state routing protocol), Intermediate System to Intermediate System (ISIS, another link state routing protocol), Enhanced Interior Gateway Routing Protocol (EIGRP), and Routing Information Protocol (RIP).

Link-state protocols are routing protocols based on link-state advertisement, of which ISIS and OSPF are examples. Characteristics of link-state protocols include the advertising by each node of its local connectivity to the rest of the other nodes. This is in contrast to distance-vector protocols, wherein each node advertises the content of its routing information base to its adjacent neighbors.

Border Gateway Protocol (BGP) is a protocol for communicating between an autonomous system and other routers in the underlying network, e.g., to connect one autonomous system to another. BGP's uses include advertising reachability information across Autonomous System boundaries and to propagate reachability information (for instance, as received from an external Autonomous System) into a local Autonomous System.

Shortest Path First (SPF) and Reverse Shortest Path First (R-SPF) are algorithms that can be executed by each router in a link-state network, for instance, by each router that executes either ISIS or OSPF. The purpose of SPF is to build a routing information base (RIB) that is used by the router to route/forward IP packets. The algorithm can use data structure and logic, including, among data structures, three lists. An "UNKNOWN" list contains all nodes known in the topology (the network) for which no path has been computed yet. A TENTative list contains nodes for which at least one path has been computed (but may not be the shortest one). A PATHS list contains a list of nodes for which shortest path to it has been computed. An SPF or R-SPF algorithm runs by moving nodes from one list to another in the order: UNKNOWN→TENT→PATHS, and stops when the TENT list is emptied. An example SPF algorithm is the Dijkstra Algorithm. The difference between SPF and R-SPF is in the way nodes are inspected and evaluated during the algorithm. The forward SPF algorithm computes the shortest path based on the cost from a reference node to each other node in the network while the R-SPF (reverse) takes into account the reverse metric, i.e., the metric from each node in the network to the reference node.

Area border router (ABR) node is a node that has connections to nodes in more than one area.

At block 26, a node 12a (referred to herein as a "requesting node") in the overlay network 10 that wishes to obtain objects/services from another node 12b in the network 10 generates a list of overlay network nodes 12b (also referred to as "peers") reflecting objects and/or services that are available at each node 12b. The list is sent at block 28 to the SG 18 executing the proximity function along with a request to re-order the list according to proximity of the peer nodes 12b to the requesting node 12a (which is the reference node in the subsequent SPF calculations). The SG 18 executes the proximity function at block 30 to generate a list ordered by proximity to the requesting node of the peer nodes 12b, preferably without disrupting the service provider of the overlay network 10. To this end, the SG 18 may be programmed to never originate any routing update pursuant to its cooperation with the overlay network 10 in the form of, e.g., ISIS or OSPF or BGP packets.

Also, the SG 18 may be programmed to never attract traffic pursuant to its cooperation with the overlay network 10 by, for example, setting appropriate values for ISIS overload bits and/or for OSPF "maxage" metrics.

With more specificity, in example non-limiting embodiments the SG 18 acquires routing information from routing protocols such as OSPF/ISIS/BGP. To do this, the SG 18 participates in the routing scheme in the sense that it establishes adjacencies/sessions with routers and collects a routing database as part of the normal routing protocols operations.

However, in example embodiments the SG does not fully become part of the routing scheme in the sense that the SG 18 does not become a "router" in terms of routing/forwarding traffic unrelated to present discussion. Accordingly, in example embodiments the SG 18 diverts incoming traffic using the overload bit (in the case of ISIS), or the "max metric" (in the case of OSPF/ISIS) such that apart from its operation discussed herein the SG 18 is transparent to the network. Thus, in example embodiments the SG 18 does not receive any traffic that would require a routing/forwarding operation; however, in example embodiments the SG 18 receives traffic if and only if such traffic is destined to the SG 18 itself.

Returning to FIG. 2, the proximity function causes the SG 18 to return the ordered list to the requesting node at block 32.

Figure 3:
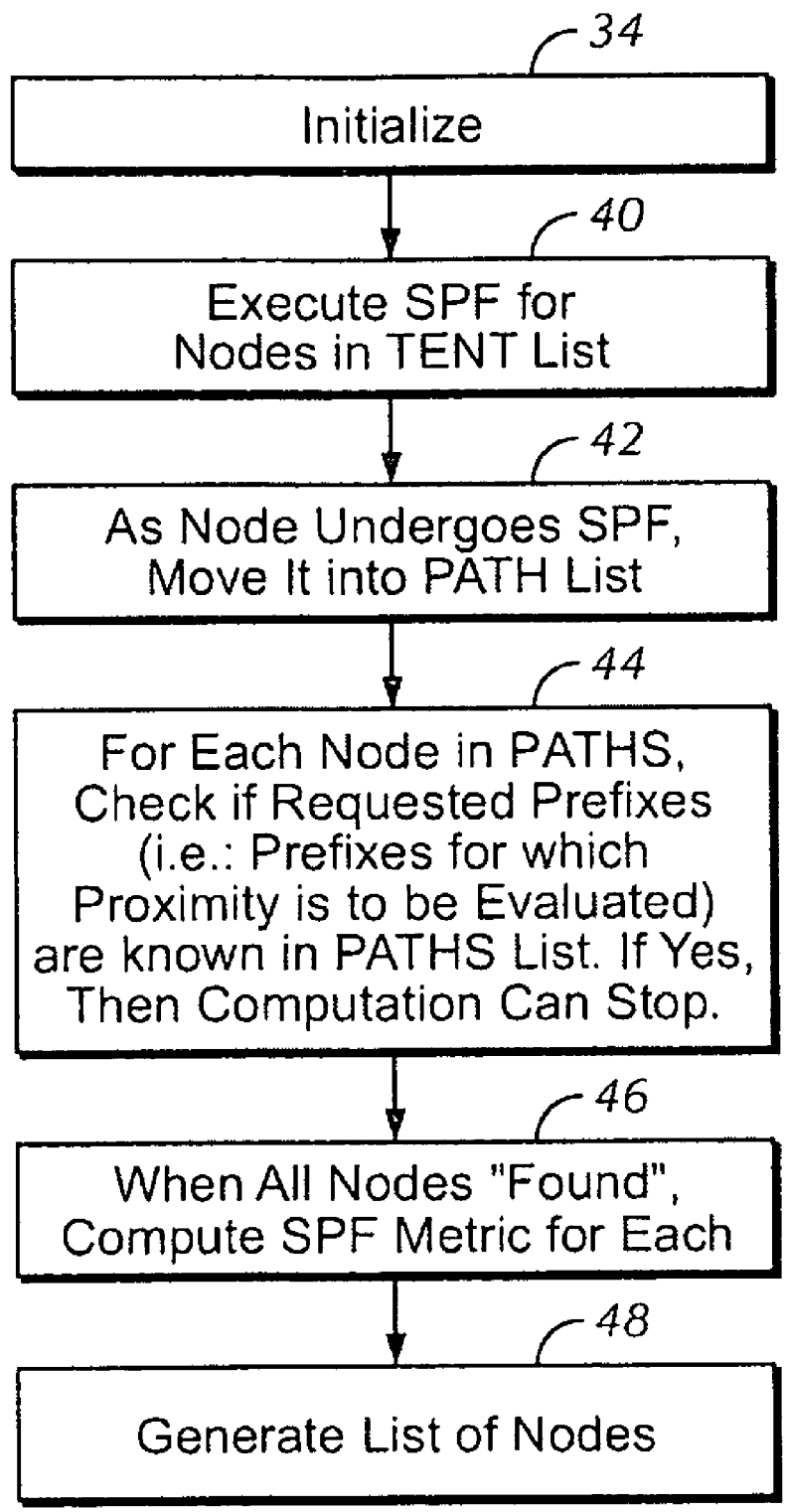
FIG. 3 is a flow chart of more detailed example logic.

FIG. 3 shows the initialization of the process in FIG. 2. Commencing at block 34 in FIG. 3, all nodes that "advertise" the requesting node are moved into a TENT list of the SG 18. By "advertise" is meant indicate a peer relationship with the requesting node. The "advertising nodes" typically are the nodes compiled by the requesting node and sent to the SG 18 as part of the request to reorder the nodes by proximity. In this way, the SG 18 is better permitted to process multi-homed prefixes.

At block 36, pseudonodes in the TENT list are given higher preference than non-pseudonodes, although no preference need be given for internal nodes over external nodes for purposes of calculating proximity. A pseudonode may be established by a local area network (LAN) or other entity that might be represented as a single node. By "preference" is meant that when a node is to be moved into the PATHS list from the TENT list and a non▲pseudonode and a pseudonode both have the same cost (root distance), the pseudonode is preferred.

Proceeding to block 38, for all TENT nodes sharing a common prefix with the requesting node (i.e., is co-located with the requesting node), the proximity of such nodes is set to zero. That is, when the requesting node shares the same subnet with one or more nodes under test (and thus are "co-located"), the co-located node or nodes under test are preferred.

Moving to block 40, a SPF cycle is started for each node in the TENT list, wherein at block 42 as each TENT node is moved into the PATHS list of the SG 18 the prefixes advertised by the node being moved are inspected at block 44. If all prefixes for which proximity is to be evaluated are processed (i.e., all prefixes to be evaluated are known into the PATHS list), then the proximity algorithm can stop because proximity has been computed for all requested prefixes.

The logic moves to block 46 when all nodes in the TENT list have been flagged as found or if all prefixes for which proximity has to be evaluated are computed. At block 46, a SPF metric is computed for each node in the PATHS list relative to the requesting node. An SPF metric represents proximity between the requesting node and another node.

When a requesting node requests an object or service a reverse-SPF calculation may be used, i.e., an SPF calculation may be made from the PATHS node under test to the requesting node. In the event that the requesting node is requesting to upload an object or service to another node in the overlay network 10, a forward-SPF calculation used, i.e., from the requesting node to the PATHS node under test.

Once proximity metrics have been calculated for all nodes in the PATHS list at block 46, the logic moves to block 48 to generate a ranked list of nodes by proximity, e.g., from closest proximity to farthest from the requesting node. The list is returned to the requesting node, which can consult the list to obtain the desired object/service, typically by communicating with the node at the "closest" end of the list.

In the case of multi-area proximity of, e.g., ISIS/OSPF, if the requesting node is known by the SG to be outside the local area of the SG, then all ABR nodes advertising the requesting node are moved into the TENT list during initialization. Proximity is then computed by taking into account closest exit points of the SG's local area. For example, proximity may be determined based on how far a node's ABR is rather than how far the node address is. Thus, in example embodiments, if a peer node to the requesting node is known to be outside the SG's local area, the respective ABR node of the out-of-area peer node will be accounted for by moving the ABR node of the peer node into the TENT list during initialization, instead of the peer node itself.

While the particular ROUTING-BASED PROXIMITY FOR COMMUNICATION NETWORKS is herein shown and described in detail, it is to be understood that the subject matter which is encompassed by the present invention is limited only by the claims.

What is claimed is:

1. An apparatus, comprising:
a processor; and
a computer readable storage medium bearing instructions to cause the processor to:
receive node identifications from a requesting node, the node identifications being associated with respective peers to the requesting node in an overlay network using infrastructure of a backbone network;
use a shortest path first (SPF) algorithm to determine a metric associated with at least one peer and the requesting node;
based at least in part on the metric, generate a list of peers ordered by proximity to the requesting node, wherein a TENT list is generated based on advertisements from certain nodes, the TENT list being generated prior to generating the list of peers; and
return the list of peers to the requesting node, wherein a subset of the peers sharing a common prefix with the requesting node is provisioned with a proximity metric of zero, the subset of the peers having a same subnet as the requesting node.

2. The apparatus of claim 1, wherein the apparatus avoids originating a routing update pursuant to its cooperation with the overlay network.

3. The apparatus of claim 2, wherein the apparatus avoids attracting traffic pursuant to its cooperation with the overlay network.

4. The apparatus of claim 1, wherein particular nodes under test are given preference by the requesting node.

5. The apparatus of claim 1, wherein pseudonodes are given higher preference than non-pseudonodes as part of generating the list of peers.

6. A tangible computer readable non-transitory medium bearing instructions executable by a computer processor for:
receiving from a requesting node in a communication network a list of other nodes in the network that can provide a desired piece of content or service to the requesting node;
generating a ranked list of the other nodes ordered by proximity to the requesting node, wherein a TENT list is generated based on advertisements from certain nodes, the TENT list being generated prior to generating the ranked list; and
returning the ranked list to the requesting node, wherein a subset of the nodes sharing a common prefix with the requesting node is provisioned with a proximity metric of zero, the subset of the nodes having a same subnet as the requesting node.

7. The medium of claim 6, wherein the ranked list is generated at least in part using a shortest path first (SPF) routing algorithm.

8. The medium of claim 6, wherein the processor avoids originating a routing update pursuant to its cooperation with the network.

9. The medium of claim 8, wherein the processor avoids originating traffic pursuant to its cooperation with the network.

10. The medium of claim 6, wherein particular nodes under test are given preference by the requesting node.

11. The medium of claim 6, wherein pseudonodes are given higher preference than non-pseudonodes as part of generating the ranked list.

12. A computer-implemented method comprising:
receiving a list of at least two nodes from a requesting node;
executing a shortest path first (SPF) algorithm on each of the at least two nodes relative to the requesting node to generate an ordered list of the at least two nodes, wherein a TENT list is generated based on advertisements from certain nodes, the TENT list being generated prior to generating the ordered list; and
returning the ordered list to the requesting node, wherein the two nodes share a common prefix with the requesting node and are provisioned with a proximity metric of zero, the two nodes having a same subnet as the requesting node.

13. The method of claim 12, wherein the method avoids originating a routing update pursuant to its cooperation with an overlay network associated with the requesting node.

14. The method of claim 13, wherein the method avoids attracting traffic pursuant to its cooperation with the overlay network.

15. The method of claim 12, wherein particular nodes under test are given preference by the requesting node.

16. The method of claim 12, wherein pseudonodes are given higher preference than non-pseudonodes as part of generating the ordered list.

17. The method of claim 12, wherein the SPF algorithm is a reverse-SPF algorithm.

* * * * *